United States Patent
Shiokawa et al.

(10) Patent No.: US 10,419,692 B2
(45) Date of Patent: Sep. 17, 2019

(54) IMAGE PICKUP APPARATUS

(71) Applicant: Maxell, Ltd., Kyoto (JP)

(72) Inventors: Junji Shiokawa, Tokyo (JP); Yuuichi Nonaka, Tokyo (JP); Mina Ootsubo, Hitachi (JP); Satoshi Nozawa, Hitachi (JP)

(73) Assignee: Maxell, Ltd., Kyoto (JP)

( * ) Notice: Subject to any disclaimer, the term of this patent is extended or adjusted under 35 U.S.C. 154(b) by 196 days.

(21) Appl. No.: 14/901,406

(22) PCT Filed: Jul. 25, 2013

(86) PCT No.: PCT/JP2013/070253
§ 371 (c)(1),
(2) Date: Dec. 28, 2015

(87) PCT Pub. No.: WO2015/011824
PCT Pub. Date: Jan. 29, 2015

(65) Prior Publication Data
US 2016/0182837 A1    Jun. 23, 2016

(51) Int. Cl.
H04N 5/33    (2006.01)
H04N 9/04    (2006.01)
H04N 9/67    (2006.01)
H04N 9/68    (2006.01)
H04N 9/73    (2006.01)

(52) U.S. Cl.
CPC ............. *H04N 5/332* (2013.01); *H04N 9/045* (2013.01); *H04N 9/67* (2013.01); *H04N 9/68* (2013.01); *H04N 9/735* (2013.01)

(58) Field of Classification Search
CPC .......... H04N 5/332; H04N 9/045; H04N 9/67; H04N 9/68; H04N 9/735

USPC ......................................................... 348/164
See application file for complete search history.

(56) References Cited

U.S. PATENT DOCUMENTS

2004/0051790 A1 * 3/2004 Tamaru .................. H04N 5/202
                                                              348/223.1
2006/0088298 A1 * 4/2006 Frame .................... H04N 5/332
                                                              386/227
(Continued)

FOREIGN PATENT DOCUMENTS

JP        2008-092247 A    4/2008

OTHER PUBLICATIONS

International Search Report of PCT/JP2013/070253.

*Primary Examiner* — Farzana Hossain
(74) *Attorney, Agent, or Firm* — Mattingly & Malur, PC

(57) ABSTRACT

In an image pickup apparatus having an image pickup unit, a color difference signal, which is generated from signals obtained from the visible light pixels and including the near-infrared light region, and a color difference signal, which is generated by removing the signals of the near-infrared light region, are combined, at a combination ratio that is in accordance with a saturation degree of the signal components of the visible light region, and then outputted. In this way, the hue can be reproduced with colors close to colors viewed by a person. A similar processing may be performed for the brightness signals. If the color difference signal generated by removing the signals of the near-infrared light region exhibits, for example, a negative value, then the signals of the near-infrared light region may be added again.

8 Claims, 12 Drawing Sheets

(56) References Cited

U.S. PATENT DOCUMENTS

2008/0203305 A1* 8/2008 Suzuki ............ H01L 27/14649
250/338.1
2010/0283866 A1* 11/2010 Numata ................ H04N 5/332
348/223.1

* cited by examiner

IMAGE PICKUP APPARATUS

TECHNICAL FIELD

The present invention relates to an image pickup apparatus.

BACKGROUND ART

The following patent literature 1 is considered as prior art in the present technical field. Paragraph 0029 in the specification of this publication describes, "the electric charge caused by light in an infrared region is contained as noise in signals SR, SG and SB which are output from a solid-state image pickup element 10. Therefore, when the signals SR, SG and SB are used as they are to constitute a color image, correct color reproducibility cannot be obtained. In the structure according to this embodiment, the signal processing unit 14 can perform processing to remove the components in the near-infrared light region from the output signals SR, SG and SB according to the output signal SIR which is from the pixels provided with near-infrared light filters."

CITATION LIST

Patent Literature

Patent Literature 1: JP-A-2008-092247

SUMMARY OF INVENTION

Technical Problem

In the image pickup element of a camera used in photographing general images, each pixel is provided with a filter for passing light in any one wavelength region among R (red), G (green) and B (blue). Thus, there are obtained three primary color signals of RGB close to the visual characteristics of human eyes. And, an infrared camera for monitoring a dark place at midnight obtains an image signal using light in an IR (near-infrared) wavelength region.

Meanwhile, to obtain a clear image in both of a bright place and a dark place, for example, a recent onboard camera generates any one signal among individual pixels R+IR, G+IR, B+IR and IR. In this case, a clear image signal using an IR signal is generated in the dark place, while RGB three primary color signals close to the visual characteristics of human eyes are generated by subtracting the IR signal from each signal of R+IR, G+IR and B+IR in the bright place.

When a color image is picked up, it is desired to capture the image to have a low brightness level for a point with low light quantity and a high brightness level for a point with high light quantity. For example, it is desired in many cases that the brightness level is higher at the center and lowers gradually at the peripheral part in the vicinity of a part which is called highlight of the image. But, in reality, the pixel level is easily saturated at the center where the light quantity is high, and the pixel level is hardly saturated at the peripheral part where the light quantity lowers gradually.

Consideration is given to a case of the above-described onboard camera using an image pickup unit which is comprised of the visible light pixels having sensitivity in a visible light region and a near-infrared light region and the near-infrared region pixels having sensitivity in the near-infrared light region.

For example, when Patent Literature 1 performs processing to remove unnecessary wavelength components of the near-infrared light region, for example, a brightness signal Y is determined as shown below from signals of SR pixel, SG pixel, SB pixel and SIR pixel which are output from the solid-state image pickup element 10.

$R'=(SR-SIR),$ $G'=(SG-SIR),$ $B'=(SB-SIR),$ and $Y=k1 \times R'+k2 \times G'+k3 \times B',$ where k1, k2 and k3 are arbitrary coefficients.

At this time, when light quantity is gradually increased, SR, SG and SB saturate earlier than SIR, so that a phenomenon in which the brightness signal Y lowers in the vicinity of the center part of highlight of the image occurs, and there is still room for improvement.

In addition, when a color image is imaged, the whole image is desirably reproduced with colors same to colors viewed by a person. For example, it is desirable that the vicinity of a light source where light quantity is high like the sun and the pixel level is saturated is expressed by only the colors of the light source and the colors of the subject other than the light source.

Similar to the above description, use of an image pickup unit comprising visible light pixels having sensitivity in a visible light region and a near-infrared light region, and a near-infrared region pixel having sensitivity in a near-infrared light region is considered.

For example, when Patent Literature 1 performs processing to remove unnecessary wavelength components in the near-infrared light region, for example, an R signal, a G signal and a B signal are determined as described below from signals of SR pixel, SG pixel, SB pixel and SIR pixel which are output from the solid-state image pickup element 10.

$R=(SR-SIR),$ $G=(SG-SIR),$ and $B=(SB-SIR).$

At this time, when the light quantity is high and any of SR, SG and SB pixels is saturated, the balance of image signals is lost, and there occurs a phenomenon in which a color not included in the subject is generated, so that there is still room for improvement.

Therefore, the present invention aims to improve the balance of the color signals and aims to provide an image pickup apparatus which performs processing so that, for example, a subject including a light source having high light quantity like the sun is reproduced with colors close to colors viewed by a person.

Some embodiments aim to further improve a brightness signal and aim to provide an image pickup apparatus which performs processing so that, for example, a brightness level increases toward the center part in the vicinity of highlight and the brightness level lowers gradually at the peripheral part.

Solution to Problem

To achieve the above-described object, the structures described in claims are adopted.

Advantageous Effects of Invention

The present invention can provide an image pickup apparatus with the balance of color signals improved and can contribute to improvement of the basic performance of the image pickup apparatus.

In addition, effects inherent to embodiments are described in the following description of embodiments.

DESCRIPTION OF EMBODIMENTS

Embodiments of the present invention are described below with reference to the drawings. In the embodiments, a first aim is to improve the balance of color signals of an image pickup apparatus, but a brightness signal can also be improved depending on embodiments. Therefore, processing to the brightness signal which is relatively easily understandable is described in Embodiment 1 to Embodiment 3, and processing to the color signal is subsequently described in Embodiment 4 to Embodiment 6.

Embodiment 1

Figure 1:
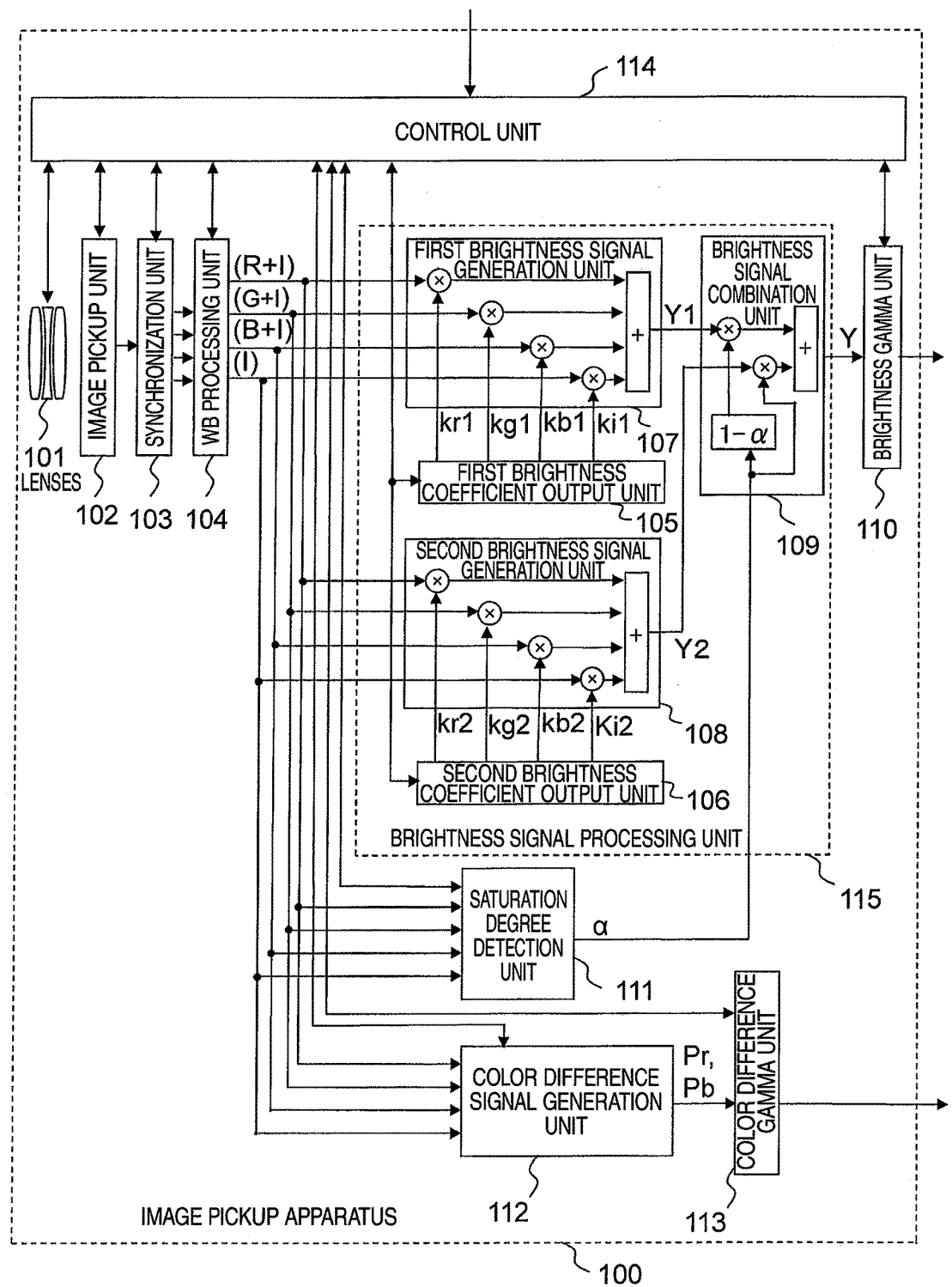
FIG. 1 is a configuration view of an image pickup apparatus in Embodiment 1.

FIG. 1 is a configuration view of an image pickup apparatus 100 of Embodiment 1.

The image pickup apparatus 100 has lenses 101, an image pickup unit 102, a synchronization unit 103, a white balance (WB) processing unit 104, a brightness signal processing unit 115, a brightness gamma unit 110, a saturation degree detection unit 111, a color difference signal generation unit 112, a color difference gamma unit 113, and a control unit 114.

The lenses 101 form an image of the light coming from a subject on the image pickup unit 102.

The image pickup unit 102 is constituted of a visible light region pixel having sensitivity in a visible light region and a near-infrared light region, and a near-infrared region pixel having sensitivity mainly in the near-infrared light region. The image pickup unit 102 performs photoelectric conversion and A/D conversion of the light imaged on each pixel by the lenses 101 and outputs a digital image signal of each pixel to the synchronization unit 103.

Figure 2:
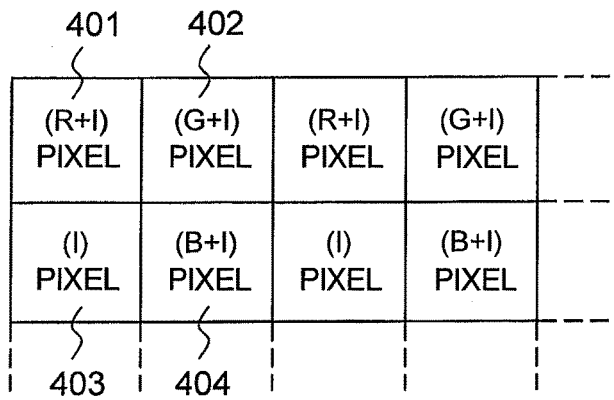
FIG. 2 is a view showing an example of an arrangement of pixels of the image pickup units in Embodiments 1 and 2.

The synchronization unit 103 performs interpolation processing of the signal from each pixel output from the image pickup unit 102, and outputs the interpolated image signal to the WB processing unit 104. The details of the interpolation processing and the origin of the name for the synchronization unit are described when FIG. 2 is explained.

The WB processing unit 104 performs white balance adjustment by integrating a gain according to a color temperature of a light source with the image signal output from the synchronization unit 103 and outputs the obtained image signal to the brightness signal processing unit 115.

The brightness signal processing unit 115 computes and obtains the brightness signal Y from the image signal output from the WB processing unit 104 and outputs to the brightness gamma unit 110. The brightness signal processing unit 115 has a first brightness coefficient output unit 105, a second brightness coefficient output unit 106, a first brightness signal generation unit 107, a second brightness signal generation unit 108, and a brightness signal combination unit 109.

The first brightness coefficient output unit 105 is controlled by the control unit 114 to set brightness coefficients kr1, kg1, kb1 and ki1 and outputs to the first brightness signal generation unit 107.

The second brightness coefficient output unit 106 is controlled by the control unit 114 to set brightness coefficients kr2, kg2, kb2 and ki2 and outputs to the second brightness signal generation unit 109.

The first brightness signal generation unit 107 executes product-sum computation of four image signals output from the WB processing unit 104 and four brightness coefficients output from the first brightness coefficient output unit 105, and outputs a brightness signal Y1.

The second brightness signal generation unit 108 executes product-sum computation of four image signals output from the WB processing unit 104 and four brightness coefficients output from the second brightness coefficient output unit 106, and outputs a brightness signal Y2.

The brightness signal combination unit 109 combines the brightness signal Y1 which is output from the first brightness signal generation unit 107 and the brightness signal Y2 which is output from the second brightness signal generation unit 108 according to the value of saturation degree α which is output from the saturation degree detection unit 111, and outputs the brightness signal Y to the brightness gamma unit 110.

The brightness gamma unit 110 outputs to the outside of the image pickup unit 100 a brightness signal which is obtained by applying gamma processing for correction of the characteristics of an outside display apparatus for the brightness signal Y which is output from the brightness signal combination unit 109.

The saturation degree detection unit 111 detects the saturation degree α of the image signal which is output from the WB processing unit 104 and outputs to the brightness signal combination unit 109.

The color difference signal generation unit 112 generates color difference signals Pr and Pb from the image signal which is output from the WB processing unit 10 and outputs to the color difference gamma unit 113.

The color difference gamma unit 113 outputs to the outside of the image pickup unit 100 a color difference signal which is obtained by applying gamma processing for correction of the characteristics of an outside display apparatus to the color difference signal which is output from the color difference signal generation unit 112.

The control unit 114 controls the whole image pickup apparatus 100 and controls the lenses 101, the image pickup unit 102, the synchronization unit 103, the WB processing unit 104, the brightness gamma unit 110, the saturation degree detection unit 111, the color difference signal generation unit 112, and the color difference gamma unit 113 according to a control signal which is input from the outside of the image pickup apparatus 100 and which indicates, for example, an operation command given by an operator. And, the control unit 114 controls by outputting a brightness coefficient to the first brightness coefficient output unit 105 and the second brightness coefficient output unit 106.

This embodiment can provide the image pickup apparatus 100 that reduces a phenomenon, in which a brightness signal lowers in the vicinity of the center part of highlight, by controlling the brightness signal combination unit 109 according to the saturation degree α detected by the saturation degree detection unit 111.

Then, the image pickup unit 102 of this embodiment is described.

FIG. 2 is a view showing an example of the arrangement of pixels in the image pickup unit 102 of Embodiments 1 and 2. In FIG. 2, four pixels, which are (R+I) pixel 401, (G+I) pixel 402, (I) pixel 403 and (B+I) pixel 404, form a unit structure of a 2×2 pixel size, and the unit structure is repeatedly arranged vertically and horizontally. It shall be noted that the former IR is abbreviated to I in the following. The former synchronization unit 103 determines, for example, three signals (R+I), (I) and (B+I) at a position of the (G+I) pixel 402 from the signals of peripheral pixels and performs interpolation processing. Thus, the image pickup apparatus 100 can obtain resolution in accordance with the number of pixels of the image pickup unit 102. The synchronization unit 103 is called a synchronization unit because four signals (R+I), (G+I), (B+I) and (I) of each pixel are determined to exist simultaneously.

Figure 3:
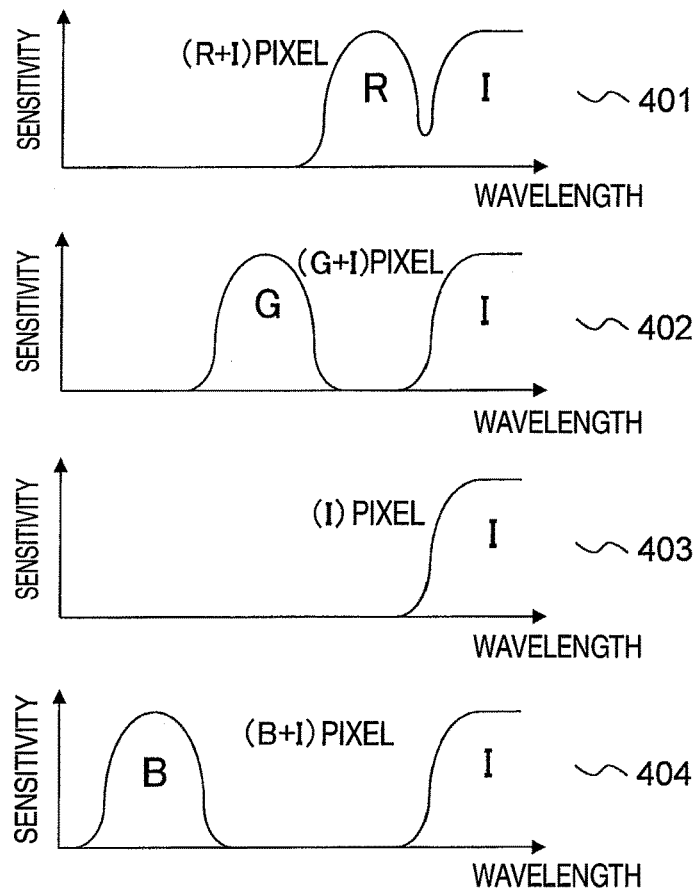
FIG. 3 is a view showing an example of wavelength sensitivity characteristics of pixels included in the image pickup units in Embodiments 1 and 2.

FIG. 3 is a view showing an example of wavelength sensitivity characteristics of the pixels contained in the image pickup unit 102 of Embodiments 1 and 2. The image pickup unit 102 includes four kinds of pixels including the (R+I) pixel 401 which is a visible light region pixel having sensitivity in the red region (R) of the visible light region and the near-infrared light region (I), the (G+I) pixel 402 which is a visible light region pixel having sensitivity in green region (G) of the visible light region and the near-infrared light region (I), the (I) pixel 403 which is a near-infrared pixel having sensitivity in the near-infrared light region (I), and the (B+I) pixel 404 which is a visible light region pixel having sensitivity in blue region (B) of the visible light region and the near-infrared light region.

When the brightness signal is determined, the components in the near-infrared light region (I) are sometimes determined to be unnecessary wavelength components if, for example, the whole image is bright from the view point of faithful reproduction of the sensitivity characteristics of human eyes to brightness. In such a case, when it is assumed that sensitivities to the near-infrared light region (I) included in the individual pixels of FIG. 3 are approximately the same, a signal having sensitivity in the red region (R) only can be obtained by, for example, subtracting the near infrared pixel (I) from the (R+I) pixel which is a visible light region pixel. The green region (G) and the blue region (B) are also the same. Even when the near infrared pixels (I) contained in each pixel have a different sensitivity, the components of the near infrared pixels (I) can be decreased by adjusting a coefficient (brightness coefficient described later) when subtracting.

Then, an operation of this embodiment is described. The image signal output from the WB processing unit 104 is represented by a signal containing each color signal of RGB. Here, the image signal is represented by the following four pixel levels:

(R+I),
(G+I),
(I), and
(B+I).

At this time, the brightness signal Y1 which is output by the first brightness signal generation unit 107 is determined as represented by Equation 1:

$$Y1 = kr1 \times (R+I) + kg1 \times (G+I) + kb1 \times (B+I) + ki1 \times (I) \quad \text{(Equation 1)}.$$

Here, kr1, kg1, kb1 and ki1 are coefficients (brightness coefficients of Y1) which are set in the first brightness coefficient output unit 105 by the control unit 114. When Equation 1 is transformed, Equation 2 is obtained:

$$Y1 = kr1 \times ((R+I)-(I)) + kg1 \times ((G+I)-(I)) + kb1 \times ((B+I)-(I)) + (kr1+kg1+kb1+ki1) \times (I) \quad \text{(Equation 2)}.$$

In other words, in case of (kr1+kg1+kb1=−ki1), it becomes equivalent to the removal of unnecessary wavelength component (I) in the near-infrared light region when the brightness signal is determined. And, for kr1, kg1 and kb1, a coefficient can be set according to a conversion formula between RGB and the brightness signal based on, for example, a standard such as ITU-R BT.709. For example, when none of (R+I), (G+I) and (B+I) is saturated by setting as represented by Equation 3, a problem, in which the unnecessary wavelength component in the near-infrared light region appears in Y1, can be prevented:

$$kr1=0.2126, kg1=0.7152, kb1=0.0722, ki1=-1.0 \quad \text{(Equation 3)}.$$

And, the brightness signal Y2 which is output by the second brightness signal generation unit 108 is determined as represented by Equation 4:

$$Y2 = kr2 \times (R+I) + kg2 \times (G+I) + kb2 \times (B+I) + ki2 \times (I) \quad \text{(Equation 4)}.$$

Here, kr2, kg2, kb2 and ki2 are coefficients (brightness coefficients of Y2) which are set in the second brightness coefficient output unit 106 by the control unit 114. But, the brightness coefficient of Y2 is limited by ki2≥0 so as not to cause a disadvantage described later. For example, coefficients changed to kr2=kr1, kg2=kg1, kb2=kb1 and ki2=0 are set. Specifically, they are set as represented by, for example, Equation 5:

$$kr2=0.2126, kg1=0.7152, kb2=0.0722, ki1=0.0 \quad \text{(Equation 5)}.$$

Figure 4:
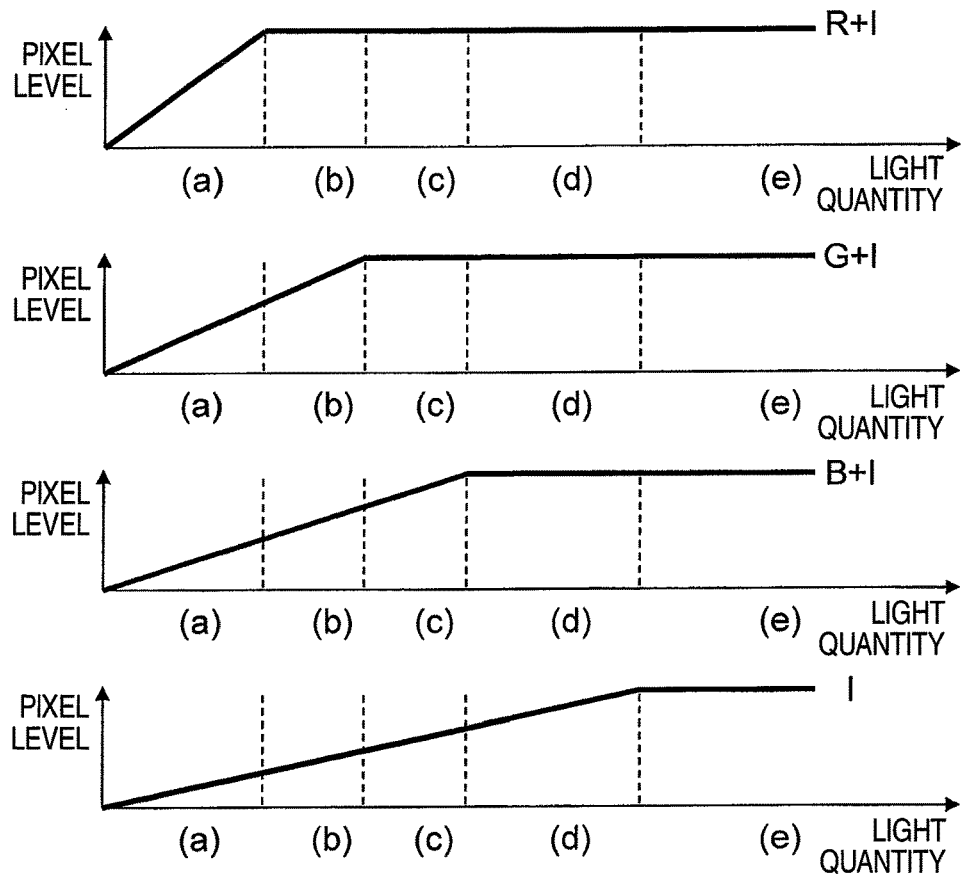
FIG. 4 is a view showing examples of control characteristics of brightness signal levels to light quantity in Embodiments 1 and 2.
Figure 4:
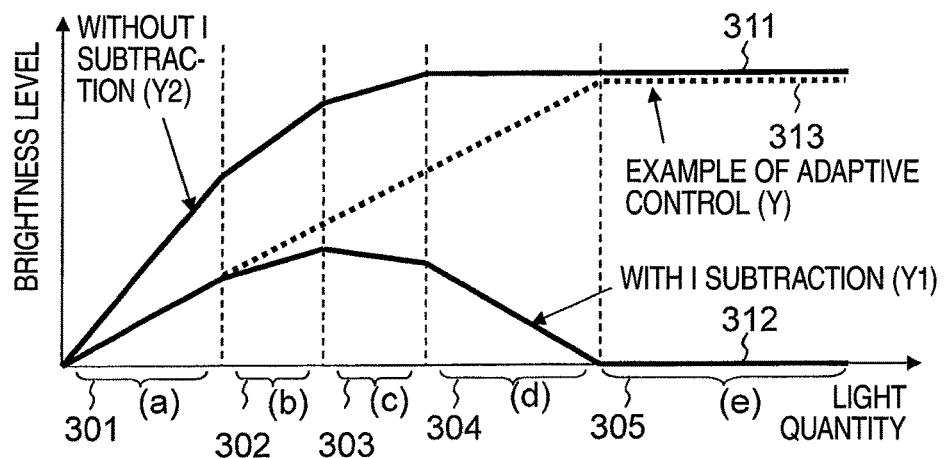

FIG. 4 is a view showing examples of control characteristics of brightness signal levels to light quantity in Embodiments 1 and 2. It is presumed in this example that a pixel level becomes high in order of (R+I), (G+I), (B+I) and (I), and saturation occurs quickly in this order when the light quantity is increased quickly.

In FIG. 4, Y1 has a characteristic as indicated by a reference numeral 312. In other words, when the light quantity is gradually increased from zero, all pixels are not saturated in section (a) where the light quantity is low, and the brightness signal level rises in proportion to the light quantity. But, in this example, the (R+I) pixel is saturated in section (b), so that the brightness signal level becomes not to be proportional to the light quantity.

In addition, the (G+I) pixel is saturated in the section (c) where the light quantity became high, the (B+I) pixel is saturated in the section (d), but the (I) pixel is not saturated yet. Therefore, the brightness signal level lowers although the light quantity increases. And, the brightness signal level becomes zero in the section (e) where all pixels are saturated.

Therefore, if the subject had highlight in it, and when a phenomenon that the brightness signal Y1 lowers in the vicinity of the center part of the highlight occurs and if Y1 is determined as it is as input of the brightness gamma unit 110, the image becomes to show that an actually bright part appears to be darker at its output by an effect of gamma correction. This disadvantage occurs because a negative value is contained in the brightness coefficient of Y1. The brightness gamma unit 110 is a configuration element essential for correction of the characteristics of the outside display apparatus, it becomes important to perform processing to correct the lowering of the brightness signal described in the previous stage.

On the other hand, Y2 has a characteristic as indicated by 311 in FIG. 4. That is to say, when the light quantity is gradually increased from zero, the brightness signal level Y2 monotonously increases in the sections (a), (b) and (c) while some pixels are saturated depending on the sections. And, the brightness level Y2 has a maximum value in the sections (d) and (e) where the pixels (R+I), (G+I) and (B+I) are separated. In this case, even when the subject has highlight therein, there does not occur a phenomenon in which a brightness signal lowers in the vicinity of the center part of highlight. But, this Y2 includes unnecessary wavelength components of the infrared light region and is not necessarily faithful to the visual characteristics of human eyes.

Accordingly, this embodiment combines Y1 having unnecessary wavelength components in the near-infrared light region removed and Y2 not having the brightness signal in the vicinity of the center part of highlight lowered so as to take their advantages. Therefore, the image pickup apparatus 100 is provided with the saturation degree detection unit 111 and the brightness signal combination unit 109. The saturation degree in this embodiment means a height of the pixel level in the output signal of the WB processing unit 104 with an increase of light quantity.

The saturation degree detection unit 111 has four signals of (R+I), (G+I), (B+I) and (I) as input and determines the saturation degree α according to, for example, the pixel level of the (I) pixel. The saturation degree α is a value between 0.0 and 1.0 indicating the saturation degree of the target pixel. A higher saturation degree indicates that the target pixel is close to saturation.

For example, when a calculation equation of the saturation degree α is determined to be Equation 6, a saturation level of the visible light region pixel corresponding to an increase of light quantity can be reflected to brightness.

$$\alpha = f1(R+I) + f2(G+I) + f3(B+I) \quad \text{(Equation 6)},$$

where f1-f3 are monotonously increasing functions.

For example, when the calculation equation of the saturation degree α is determined to be Equation 7, an increase of light quantity can be detected and can reflected to brightness even in the section (section d) where the light quantity is high and all visible light region pixels are saturated:

$$\alpha = f4(I), \quad \text{(Equation 7)},$$

where f4 is a monotonously increasing function.

For example, when the calculation equation of the saturation degree α is determined to be Equation 8, both of the saturation level of the visible light region pixel corresponding to an increase of the light quantity and the increase of light quantity after the saturation of the visible light region pixel can be detected and reflected to brightness:

$$\alpha = f1(R+I) + f2(G+I) + f3(B+I) + f4(I) \quad \text{(Equation 8)}.$$

And, for example, when the calculation equation of the saturation degree α is determined to be Equation 9, a saturation level of the visible light region pixel corresponding to an increase of the light quantity can be determined by a simple equation and reflected to brightness:

$$\alpha = f5(\text{Max}((R+I),(G+I),(B+I))) \quad \text{(Equation 9)},$$

where Max is a function for determining a maximum value of three values.

The brightness signal combination unit 109 performs computation expressed by Equation 10:

$$Y = (1-\alpha) \times Y1 + \alpha \times Y2 \quad \text{(Equation 10)}.$$

Equation 10 is an operation for determining Y by dividing internally the brightness signal Y1 and the brightness signal Y2 based on the ratio of α. A higher saturation degree α indicates that contribution of the brightness signal Y2 to the brightness signal Y to be determined increases.

In FIG. 4, a reference numeral 313 indicates a brightness level of the brightness signal Y which is output by the brightness signal combination unit 109. This brightness signal Y has a small number of unnecessary wavelength components of the near-infrared light region in the section (a) where light quantity is low. And, since the brightness signal Y monotonously increases from sections (a) to (d), there is a feature in that a phenomenon that the brightness signal lowers in the vicinity of the center part of highlight is difficult to occur.

Embodiment 2

Figure 5:
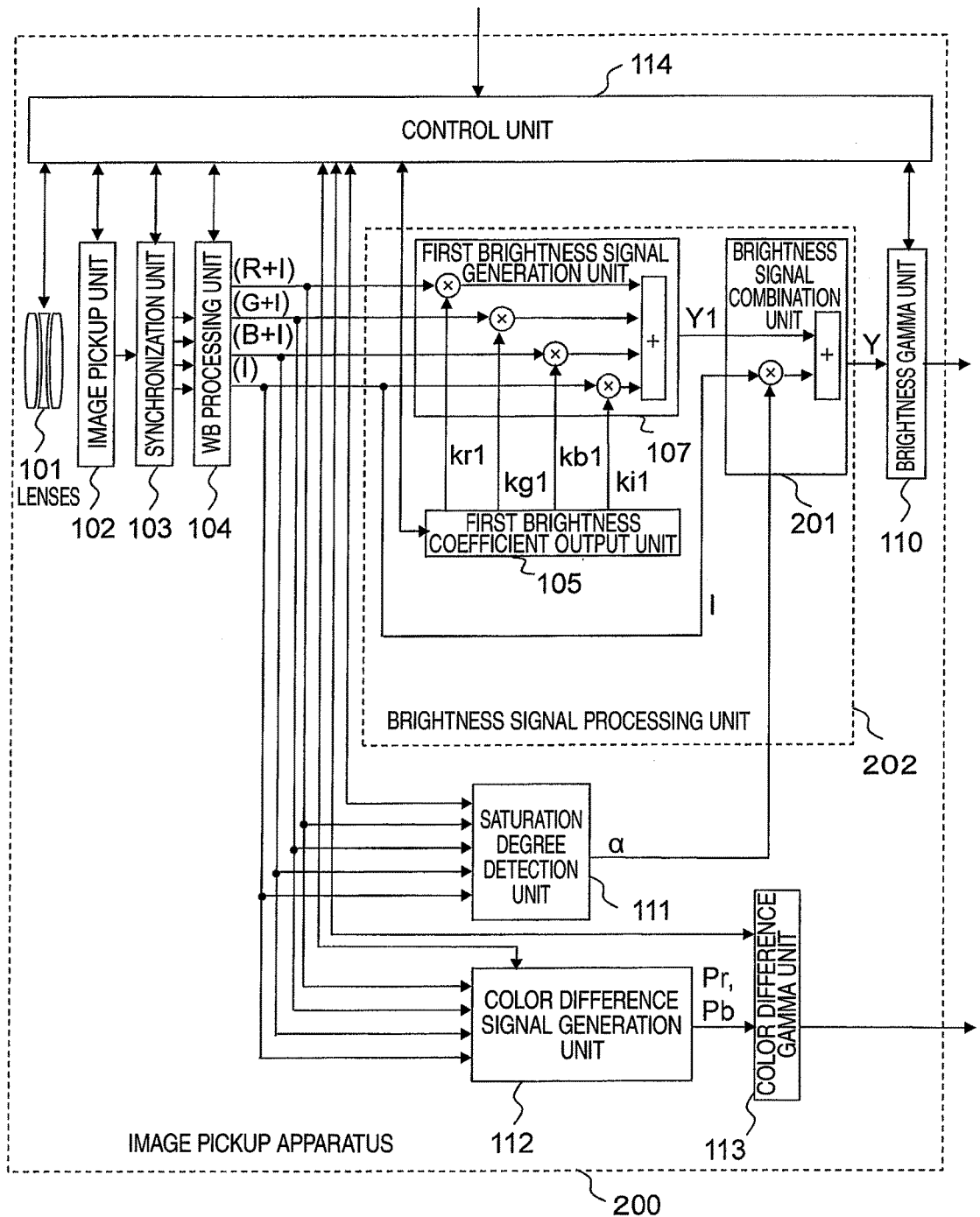
FIG. 5 is a configuration view of the image pickup apparatus in Embodiment 2.

FIG. 5 is a configuration view of an image pickup apparatus 200 of Embodiment 2.

The image pickup apparatus 200 is comprised of lenses 101, an image pickup unit 102, a synchronization unit 103, a WB processing unit 104, a brightness signal processing unit 202, a brightness gamma unit 110, a saturation degree detection unit 111, a color difference signal generation unit 112, a color difference gamma unit 113, and a control unit 114.

The lenses 101, the image pickup unit 102, the synchronization unit 103, the WB processing unit 104, the brightness gamma unit 110, the saturation degree detection unit 111, the color difference signal generation unit 112, the color difference gamma unit 113, and the control unit 114 of FIG. 5 may be the same as those of FIG. 1.

The brightness signal processing unit 202 computes and obtains the brightness signal Y from an image signal which is output from the WB processing unit 104 and outputs to the brightness gamma unit 110. The brightness signal processing unit 202 has a first brightness coefficient output unit 105, a first brightness signal generation unit 107, and a brightness signal combination unit 201.

The first brightness coefficient output unit 105 and the first brightness signal generation unit 107 of FIG. 5 may be same as those of FIG. 1.

The brightness signal combination unit 202 combines the brightness signal Y1 which is output from the first brightness signal generation unit 107 and image signal I which is output from the WB processing unit 104 according to a saturation degree α which is output from the saturation degree detection unit 111, and outputs a brightness signal.

This embodiment can be provide the image pickup apparatus 200 by which a phenomenon, in which a brightness signal lowers in the vicinity of the center part of highlight, is difficult to occur by controlling the brightness signal combination unit 201 according to the saturation degree α detected by the saturation degree detection unit 111.

In addition, in comparison with the structure of FIG. 1 of Embodiment 1, the second brightness coefficient output unit 106 and the second brightness signal generation unit 108 are deleted in FIG. 5, and the brightness signal combination unit 201 is simplified, so that the image pickup apparatus 200 with a smaller circuit scale than in FIG. 1 can be provided.

Then, an operation of this embodiment is described.

In Embodiment 2, the brightness signal Y1 which is output by the first brightness signal generation unit 107 is calculated as indicated by Equation 11 in the same manner as in Embodiment 1:

$$Y1 = kr1 \times (R+I) + kg1 \times (G+I) + kb1 \times (B+I) + ki1 \times (I) \quad \text{(Equation 11).}$$

Specifically, for example, as to a brightness coefficient of Y1, a problem of unnecessary wavelength components in the near-infrared light region appearing in Y1 can be prevented by setting as represented by Equation 3 in the same manner as in Embodiment 1 when none of (R+I), (G+I) and (B+I) is saturated:

$$kr1=0.2126, kg1=0.7152, kb1=0.0722, ki1=-1.0 \quad \text{(Equation 3).}$$

The saturation degree detection unit 111 has as input four image signals of (R+I), (G+I), (B+I) and (I) in the same manner as in Embodiment 1 and, for example, the saturation degree α is determined according to the pixel level of the (I) pixel. The saturation degree α is a value between 0.0 and 1.0 indicating the saturation degree of the target pixel. A higher saturation degree indicates that the target pixel is close to saturation.

The brightness signal combination unit 201 performs computation of Equation 12:

$$Y = Y1 + \alpha \times (I) \quad \text{(Equation 12).}$$

In FIG. 5, different from FIG. 1, not the output of the second brightness signal generation unit 108, but the image signal (I) output by the WB processing unit 104 is input to the brightness signal combination unit 201.

In FIG. 4, the reference numeral 312 indicates a brightness level of the brightness signal Y1.

In FIG. 4, the reference numeral 313 indicates a brightness level of the brightness signal Y which is output by the brightness signal combination unit 201. Similar to Embodiment 1, this brightness signal Y has a small number of unnecessary wavelength components in the near-infrared light region in the section (a) with low light quantity. And, from the sections (a) to (d), the image signals of (I) are added in a larger number with an increase of the saturation degree α, so that the brightness signal Y monotonously increases. Therefore, there is a characteristic that a phenomenon, in which the brightness signal lowers in the vicinity of the center part of highlight, is difficult to occur.

The same effect can also be obtained in this embodiment by another structure example, in which the calculation equation of the saturation degree α is set by fixing to ki1=0 so that the saturation degree α increases monotonously with an increase of the light quantity. In this case, term of ki1×(I) can be removed from the first brightness signal generation unit 107, so that the image pickup apparatus 200 can be provided with a small circuit scale.

Embodiment 3

Figure 6:
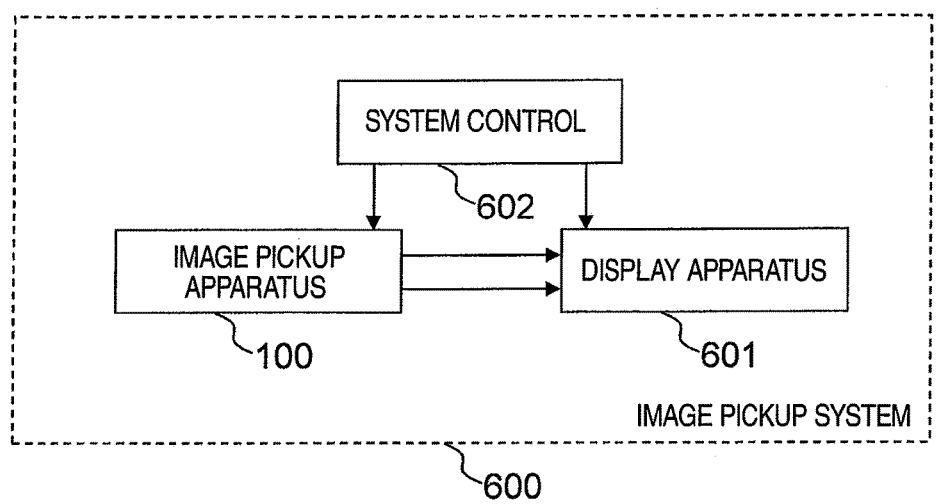
FIG. 6 is a configuration view of the image pickup system in Embodiment 3.

FIG. 6 is a configuration view of an image pickup system 600 in Embodiment 3.

The image pickup system 600 has an image pickup apparatus 100, a display apparatus 601, and a system control unit 602.

The image pickup apparatus 100 is the same as the image pickup apparatus 100 in FIG. 1 of Embodiment 1. It may also be the same as the image pickup apparatus 200 in FIG. 5 of Embodiment 2.

The display apparatus 601 is a color image display apparatus such as a liquid crystal monitor for displaying images based on a brightness signal and a color difference signal which are output from the image pickup unit 100.

The system control unit 602 controls the image pickup apparatus 100 and the display apparatus 601.

According to this embodiment, a phenomenon, in which the brightness signal in the vicinity of the center part of highlight lowers, is hard to occur, in connection with the brightness signal which is output from the image pickup apparatus 100, so that an image pickup system which can show a high quality image on the display apparatus 601 can be provided.

Embodiment 4

Figure 7:
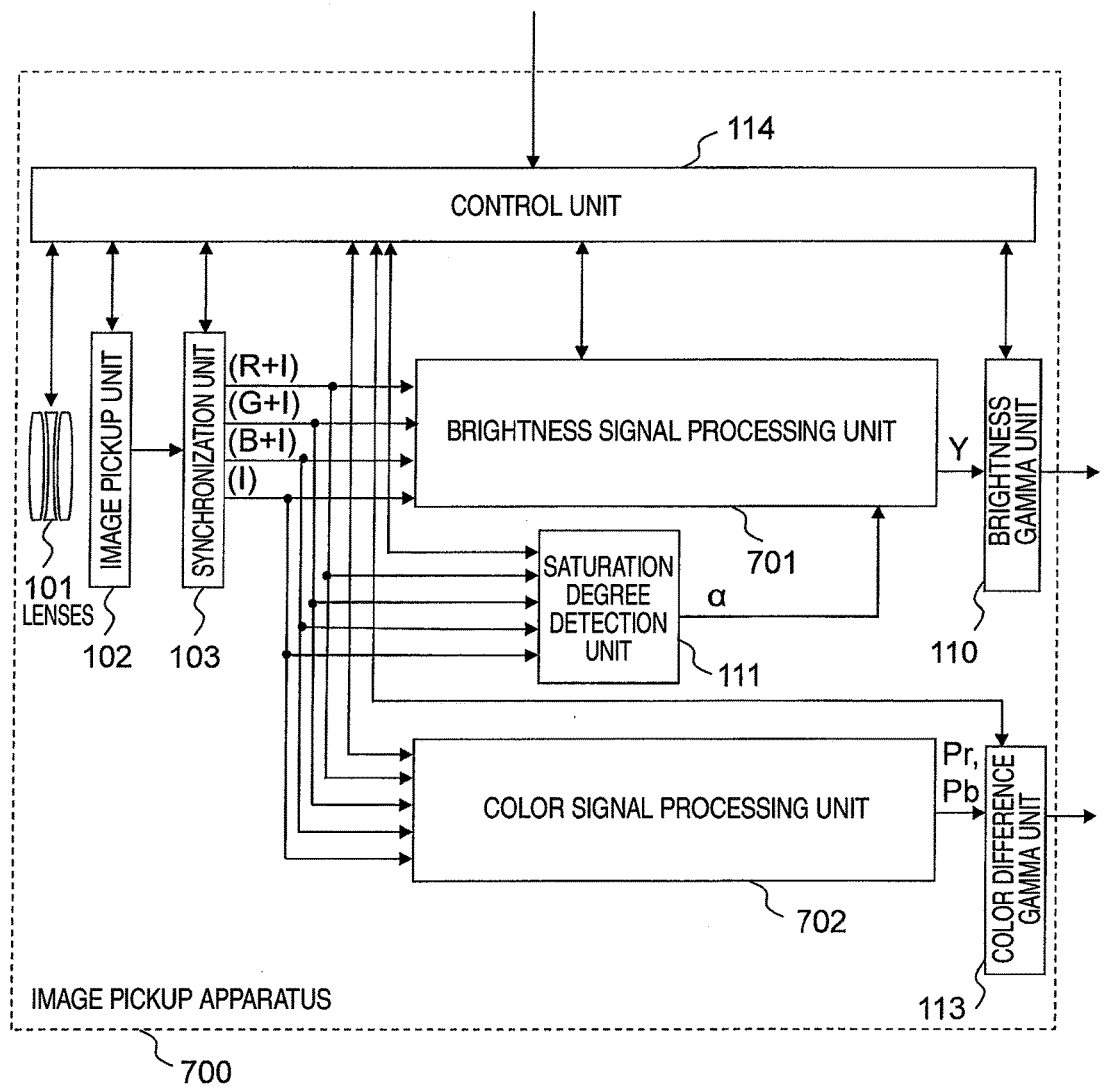
FIG. 7 is a configuration view of the image pickup apparatus in Embodiment 4.

FIG. 7 is a configuration view of an image pickup apparatus 700 in Embodiment 4.

The image pickup apparatus 700 has lenses 101, an image pickup unit 102, a synchronization unit 103, a brightness signal processing unit 701, a brightness gamma unit 110, a saturation degree detection unit 111, a color signal processing unit 702, a color difference gamma unit 113, and a control unit 114.

The lenses 101, the image pickup unit 102, the synchronization unit 103, the brightness gamma unit 110, the saturation degree detection unit 111, the color difference gamma unit 113, and the control unit 114 in FIG. 7 may be the same as those of FIG. 1.

The brightness signal processing unit 701 may be the same as either of the brightness signal processing unit 115 of FIG. 1 or the brightness signal processing unit 202 of FIG. 5.

Figure 8:
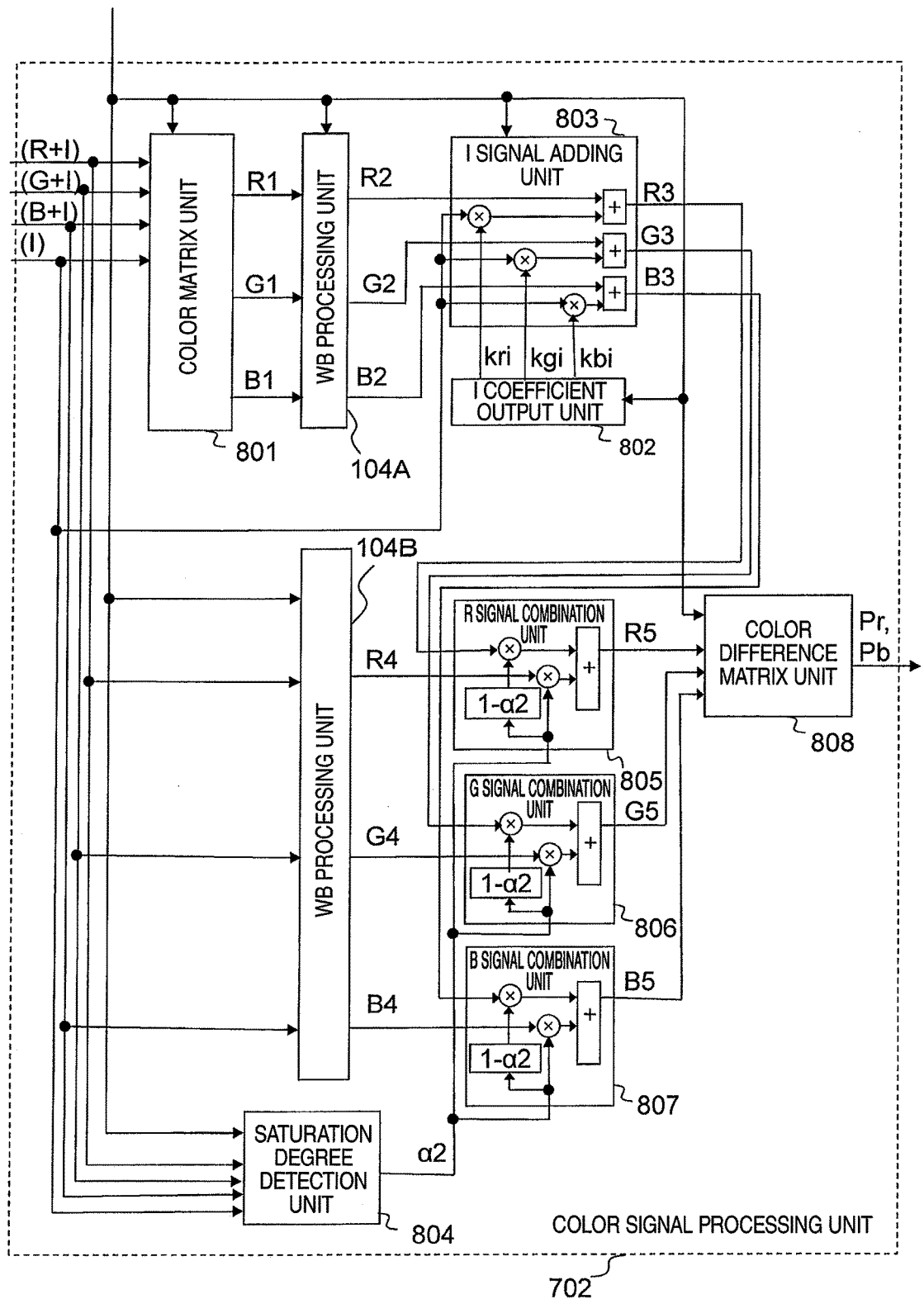
FIG. 8 is a configuration view of the color signal processing unit in Embodiment 4.

FIG. 8 is a configuration view of the color signal processing unit 702 of Embodiment 4 and has a new structure for realizing accurate color reproducing processing.

The color signal processing unit 702 has a color matrix unit 801, an I coefficient output unit 802, an I signal adding unit 803, WB processing units 104A and 104B, a saturation degree detection unit 804, an R signal combination unit 805, a G signal combination unit 806, a B signal combination unit 807, and a color difference matrix unit 808.

The WB processing units 104A and 104B of FIG. 8 both are the same as the WB processing unit 104 of FIG. 1. The WB processing unit 104A of this embodiment has as input the image signal which is output from the color matrix unit 801, and the WB processing unit 104B has as input the image signal which is output from the synchronization unit 103. Since two WB processing units are provided, the image signals can be controlled independently.

The color matrix unit 801 performs matrix computation of four input signals (R+I), (G+I), (B+I) and (I) on the basis of a control signal which is input from the control unit 114 to generate three primary color signals R1, G1 and B1 which are image signals, and outputs to the WB processing unit 104A.

The WB processing unit 104A performs white balance adjustment by integrating a gain corresponding to the color temperature of the light source with the image signals R1, G1 and B1 which are output from the color matrix unit 801, and outputs three primary color signals of the obtained image signals R2, G2 and B2 to the I signal adding unit 803.

The I coefficient output unit 802 sets the I coefficients kri, kgi and kbi under control by the control unit 114, and outputs to the I signal adding unit 803.

The I signal adding unit 803 executes product-sum computation of the I coefficient which is output from the I coefficient output unit 802 to the image signal which is output from the WB processing unit 104A, and outputs each of the three primary color signals of the obtained image signals R3, G3 and B3 to the R signal combination unit 805 through the B signal combination unit 807.

The saturation degree detection unit 804 detects saturation degree $\alpha 2$ of the image signal which is output from the synchronization unit 103 and outputs to the R signal combination unit 805 through the B signal combination unit 807.

The R signal combination unit 805 combines the R3 signal which is output from the I signal adding unit 803 and an R4 signal which is output from the WB processing unit 104B according to the saturation degree $\alpha 2$ which is output from the saturation degree detection unit 804, and outputs an R5 signal to the color difference matrix unit 808.

The G signal combination unit 806 combines the G3 signal which is output from the I signal adding unit 803 and a G4 signal which is output from the WB processing unit 104B according to the saturation degree $\alpha 2$ which is output from the saturation degree detection unit 804, and outputs a G5 signal to the color difference matrix unit 808.

The B signal combination unit 807 combines the B3 signal which is output from the I signal adding unit 803 and a B4 signal which is output from the WB processing unit 104B according to the saturation degree $\alpha 2$ which is output from the saturation degree detection unit 804, and outputs a B5 signal to the color difference matrix unit 808.

The color difference matrix unit 808 performs matrix computation of the input image signals R5, G5, B5 according to the control signal which is input from the control unit 114 to generate color difference signals Pr and Pb, and outputs to the outside of the color signal processing unit 702, namely to the color difference gamma unit 113 of FIG. 7.

According to this embodiment, an image signal which is output from the matrix unit 801 and an image signal which is output from the synchronization unit 103 become image signals which reproduce colors corresponding to the color temperatures of the light source by the two WB processing units 104A and 104B. And, the R signal combination unit 805, the G signal combination unit 806, and the B signal combination unit 807 are controlled according to the saturation degree $\alpha 2$ which is detected by the saturation degree detection unit 804, and an image signal corresponding to the color temperature of the light source is combined. Therefore, there are characteristics that unnecessary wavelength components of the near-infrared light region are few in a light color image, and processing can be performed to reproduce the same colors as those viewed by a person in an image having high light quantity and a saturated pixel level.

Then, an operation of this embodiment is described.

The color matrix unit 801 has, as input, four colors (R+I), (G+I), (B+I) and (I), performs computation represented by Equations 13 through 15, and outputs image signals of R1, G1 and B1:

$$R1=kr3\times(R+I)+kg3\times(G+I)+kb3\times(B+I)+ki3\times(I) \quad \text{(Equation 13)},$$

$$G1=kr4\times(R+I)+kg4\times(G+I)+kb4\times(B+I)+ki4\times(I) \quad \text{(Equation 14)},$$

and $$B1=kr5\times(R+I)+kg5\times(G+I)+kb5\times(B+I)+ki5\times(I) \quad \text{(Equation 15)}.$$

Here, kr3, kg3, kb3, ki3, kr4, kg4, kb4, ki4, kr5, kg5, kb5 and ki5 are coefficients (color coefficients of R1, G1 and B1) which are output from the control unit 114.

The color matrix unit 801 outputs an image signal after subtraction of the component of the near infrared pixel (I) which is an unnecessary wavelength component. For example, the color matrix unit 801 can set the coefficients as represented by Equation 16 to output (R), (G) and (B) components excepting the unnecessary wavelength component:

$$\begin{array}{l}kr3=1.00, kg3=0.00, kb3=0.00, ki3=-1.00, kr4=0.00,\\ kg4=1.00, kb4=0.00, ki4=-1.00, kr5=0.00,\\ kg5=0.00, kb5=1.00, ki5=-1.00\end{array} \quad \text{(Equation 16)}.$$

In addition, the I signal adding unit 803 adds the (I) component according to the value of the I coefficient to the input image signal to solve a problem which occurs when the unnecessary wavelength components of the near-infrared light region as described lastly in Embodiment 4. In other words, the (I) component is subtracted by the color matrix unit 801, and the (I) signal corresponding to a prescribed coefficient which is output from the control unit 114 is added to the image signal to which the gain corresponding to the color temperature of the light source was integrated by the WB processing unit 104A. Thus, for example, when the light quantity of the subject in the visible light region and the near-infrared light region is high and the color is near to an achromatic color, colors closer to colors viewed by a person can be reproduced. It is not necessary to specially consider the above matter until the end of the explanation in Embodiment 4, but it is appropriate to consider a case that the outputs R3, G3 and B3 of the I signal adding unit 803 are signals which have the unnecessary wavelength component in the near-infrared light region removed, namely a case that kri=kgi=kbi=0 and the I coefficient all are zero.

The saturation degree detection unit 804 has four signals of (R+I), (G+I), (B+I) and (I) as input, and determines the saturation degree $\alpha 2$ in, for example, a region of 3×3 pixel having a target pixel at the center according to the maximum value of the pixel level. The saturation degree $\alpha 2$ is a value from 0.0 to 1.0 indicating a saturation degree of the target pixel. A higher saturation degree indicates that the signal of the target pixel is close to saturation.

Figure 9:
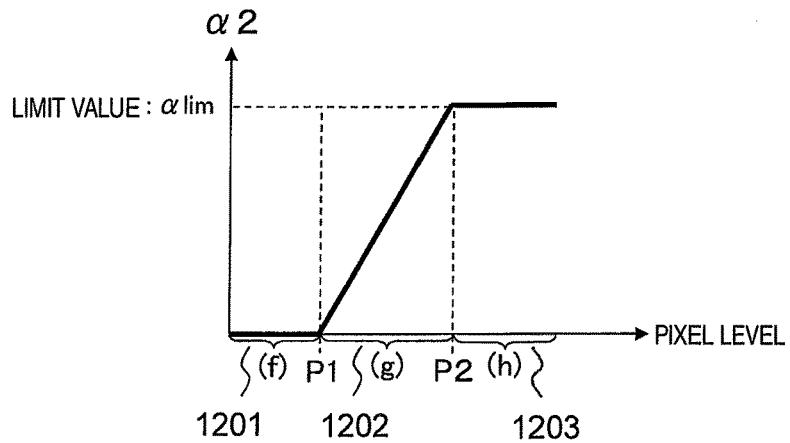
FIG. 9 is a view showing examples of calculating saturation degrees in Embodiments 4 and 5.

FIG. 9 is a view showing examples of calculating saturation degrees in Embodiments 4 and 5.

For example, as shown in FIG. 9, control signals indicating threshold values P1 and P2 against the pixel level and limit value $\alpha$lim and gain (inclination in section (g)) against the saturation degree $\alpha 2$ are input to the saturation degree detection unit 804 by the control unit 114. Thus, it is determined that the saturation degree $\alpha 2$ is a low value and constant in section (f) where the pixel level is low, the saturation degree $\alpha 2$ monotonously increases according to the value of gain in section (g) where the pixel level becomes middle, and the saturation degree $\alpha 2$ is constant value $\alpha$lim as a limit value in section (h) where the pixel level is high. By controlling in this way, the color represented by the image signal can be made close to the original color of the subject.

The R signal combination unit 805, the G signal combination unit 806 and the B signal combination unit 807 perform computation represented by Equations 17 through 19:

$$R5=(1-\alpha 2)\times R4+\alpha 2\times R3 \quad \text{(Equation 17)},$$

$$G5=(1-\alpha 2)\times G4+\alpha 2\times G3 \quad \text{(Equation 18), and}$$

$$B5=(1-\alpha 2)\times B4+\alpha 2\times B3 \quad \text{(Equation 19)}.$$

Equations 17 through 19 are for calculations to combine the image signals R3, G3 and B3 having unnecessary components of the near-infrared light region removed by the color matrix unit 801 with the image signals R4, G4 and B4 having unnecessary components of the near-infrared light region based on the value of the saturation degree $\alpha 2$. By combining the image signal in this way, a problem that the subject's colors in the vicinity of the visible light signal saturation are different from actual colors can be reduced by this image pickup apparatus using the near-infrared light region components as described below.

In this embodiment, white balance processing of the outputs R1, G1 and B1 of the color matrix unit 801 with the near-infrared region removed from the visible light region pixel including the visible light region and the near-infrared region, and white balancing of (R1+I), (G1+I), (B1+I) and I are independently performed by the WB processing units 104A and 104B in FIG. 8. In other words, they are individually undergone the optimum white balance control. Therefore, a color signal processing apparatus having good color reproducibility can be provided.

Then, the problems to be solved by this embodiment are described in detail.

Figure 10:
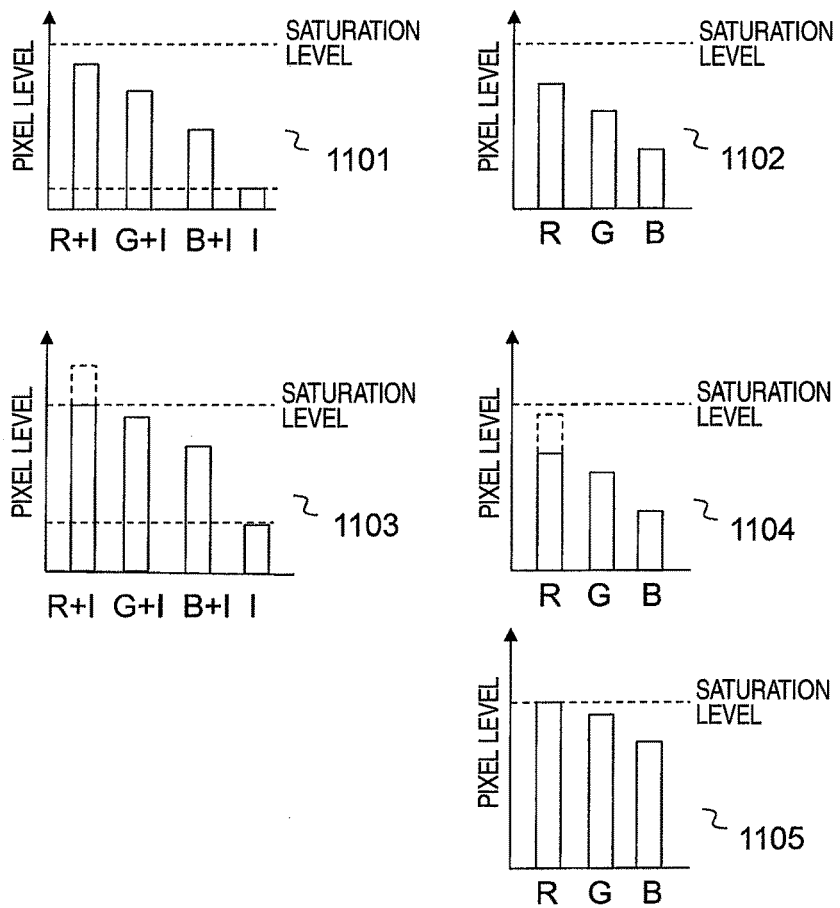
FIG. 10 is a view showing examples of image signals in Embodiments 4 and 5.

FIG. 10 is a view showing examples of image signals in Embodiments 4 and 5, showing image signals (R+I), (G+I), (B+I) and (I) which are output from the synchronization unit 103 in the left half, and image signals (R), (G) and (B) with unnecessary wavelength components removed in the right half.

A reference numeral 1101 denotes a case that the pixel levels of the image signals which are output from the synchronization unit 103 are not saturated.

A reference numeral 1102 is an example of image signals with an unnecessary wavelength component removed from the image signals indicated by the reference numeral 1101. It is seen that the balance of the image signals is not lost because none of the image signals output from the synchronization unit 103 is saturated.

A reference numeral 1103 denotes a case that the pixel level of (R+I) is saturated among the image signals which are output from the synchronization unit 103. The pixel level of (R+I) becomes a saturation level because the pixel level of (R+I) is saturated and has a value lower than actual light quantity.

A reference numeral 1104 is an example of image signals with an unnecessary wavelength component removed from the image signals denoted by the reference numeral 1103. Since the pixel level of (R+I) is saturated, the balance of light quantity inherent in the subject and the balance of the image signals are different. Therefore, the colors represented by the image signals are colors not existing in the subject. This problem occurs when the color matrix unit 801 generates image signals of R1, G1 and B1 having an unnecessary wavelength component removed from the input image signals.

A reference numeral 1105 is an example of determining R, G and B signals without removing an unnecessary wavelength component from the (R+I), (G+I) and (B+I) signals indicated by the reference numeral 1103. This image signals corresponds to the image signals of R4, G4 and B4 which are output from the WB processing unit 104.

This embodiment can accurately reproduce the colors possessed by the subject by composing the image signals indicated by the reference numeral 1102 and the image signals indicated by the reference numeral 1105 by the R signal generation unit 805 through the B signal combination unit 807 according to the saturation degree.

Figure 11:
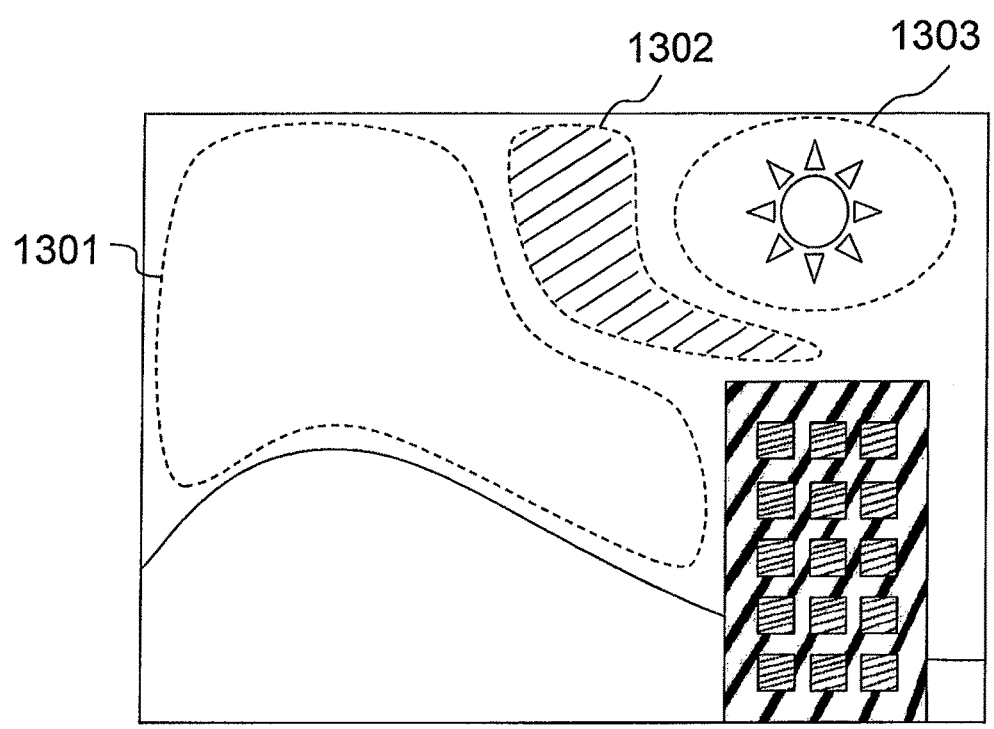
FIG. 11 is a view showing subjects in Embodiments 4 and 5.

FIG. 11 is a view showing the subjects of Embodiments 4 and 5, namely an image figure of the image shown when the sun, sky, building and mountain are determined as the subject. This image figure is assumed to have the following.

The area indicated by a reference numeral 1301 is sky and looks blue. The area indicated by a reference numeral 1303 includes the sun and looks white because the light quantity is high. The area indicated by a reference numeral 1302 is between the sun and the sky and looks a color with blue and white mixed.

The above areas are corresponded with the image of the image signals of FIG. 10 and further presumed as follows.

In the reference numeral 1301, the pixel level is not saturated as indicated by the reference numeral 1101 in FIG. 10. In the reference numeral 1302, any of the image signals is saturated as indicated by the reference numeral 1103 in FIG. 10. In the reference numeral 1303, all the image signals are saturated.

Since the pixel level is not saturated in the reference numeral 1301, the color balance is not lost even when the unnecessary wavelength component is removed. Since all of the image signals are saturated in the reference numeral 1303, an achromatic color is formed. But, the reference numeral 1302 has a phenomenon that the color balance is lost by the saturated image signal.

Therefore, in order to more faithfully reproduce the colors of the subject in this embodiment, the saturation degree detection unit 804, the R signal combination unit 805, the G signal combination unit 806, and the B signal combination unit 807 are used to combine R1, G1 and B1, which have the unnecessary wavelength component of the near-infrared light region removed, with R4, G4 and B4 having the unnecessary wavelength component while varying their ratios according to the saturation degree $\alpha 2$. In other words, when the saturation degree is low, color reproducibility is good when R1, G1 and B1 with the unnecessary wavelength component removed, and when any of the colors is saturated, color reproducibility is good when R4, G4 and B4 are used even if there is an unnecessary wavelength component. Therefore, they are combined while varying the ratios according to the saturation degree $\alpha 2$ to generate signals R5, G5 and B5 which are output to the color difference matrix unit 808.

Similar to the above-described case of processing the brightness signal, color reproducibility can be made better by performing the above processing described in the previous stage of the color difference gamma unit 113 for the color signal.

In this embodiment, the saturation degree means a height of the pixel level of the signal output from the synchronization unit 103 when the light quantity increases.

In addition, when the (I) component is higher in pixel level than the (R+I), (G+I) and (B+I) components in the image signal which is output from the synchronization unit 103, the image signal with the unnecessary wavelength component removed has a negative value. When the image signal has a negative value, the pixel level of the image signal is rounded up to zero, so that there occurs a phenomenon that the balance of the image signals is lost. To solve the above problem, this embodiment prevents the phenomenon, in which the image signal balance is lost, by adding again the (I) component in a segment corresponding to the I coefficient to the image signal, which has the unnecessary wavelength component removed, by the I signal adding unit 803 as described above.

In this case, the image signal output from the I signal adding unit 803 is combined with the image signals of R4, G4 and B4, which do not have the unnecessary wavelength component removed, by the R signal combination unit 805, the G signal combination unit 806 and the B signal combination unit 807 based on the value of the saturation degree α2 detected by the saturation degree detection unit 804. Thus, when the (I) component is larger than the (R+I), (G+I) or (B+I) component, a problem that the subject in the vicinity of the visible light signal saturation has colors different from actual colors can be reduced by this image pickup apparatus which also uses an infrared light region component.

Embodiment 5

Figure 12:
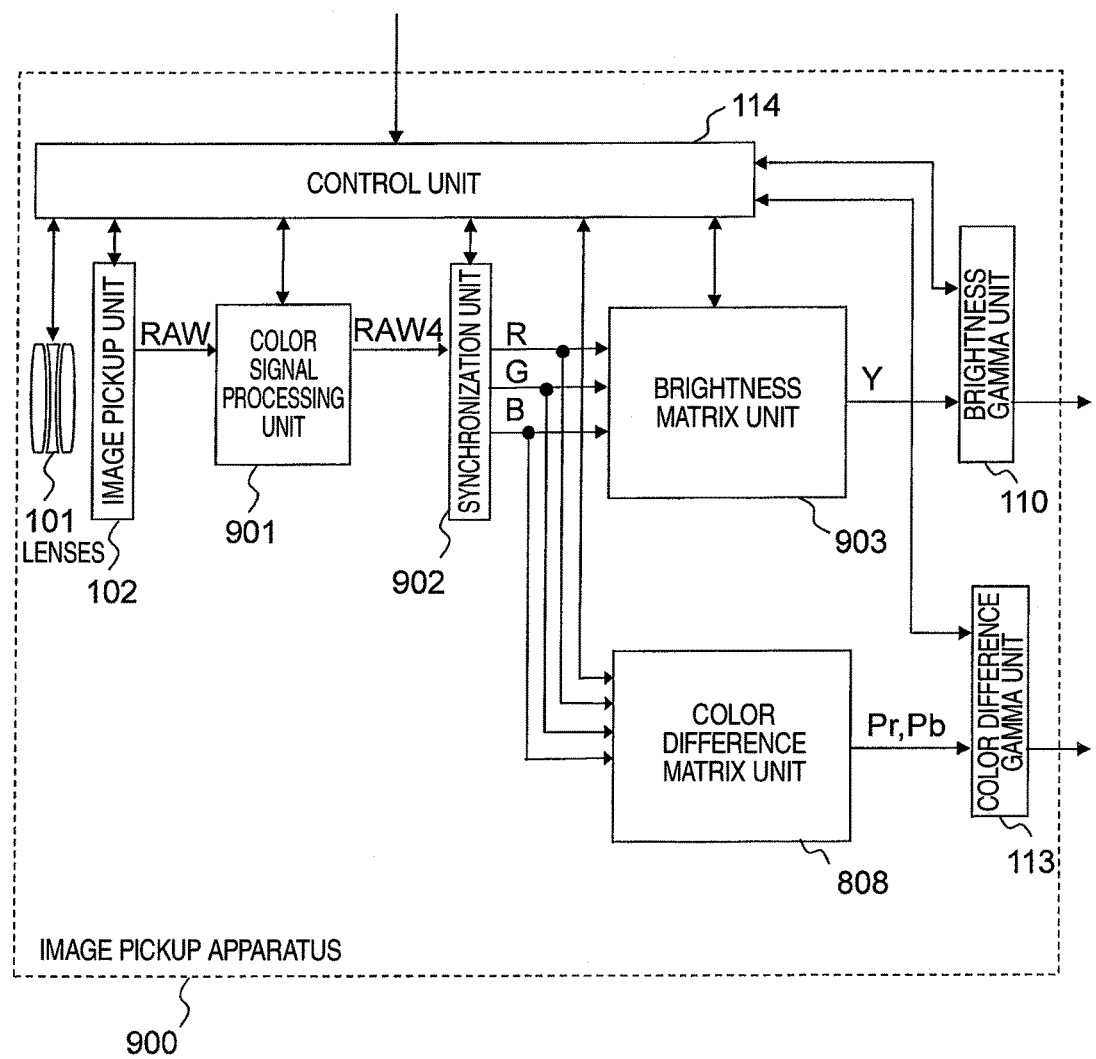
FIG. 12 is a configuration view of the image pickup apparatus in Embodiment 5.

FIG. 12 is a configuration view of an image pickup apparatus 900 in Embodiment 5.

The image pickup apparatus 900 has lenses 101, an image pickup unit 102, a color signal processing unit 901, a synchronization unit 902, a brightness matrix unit 903, a color difference matrix unit 808, a brightness gamma unit 110, a color difference gamma unit 113, and a control unit 114.

The lenses 101, the image pickup unit 102, the brightness gamma unit 110, the color difference gamma unit 113, and the control unit 114 in FIG. 12 are the same as those in FIG. 1. But, it is assumed in this embodiment that the image signal output from the image pickup unit 102 is in a RAW (which means unprocessed raw data) form. The RAW form signal is in a format that the color signal changes depending on a coordinate position. For example, pixels with image pickup elements arranged in the image pickup unit 102 are determined to be pixels which generate a signal of (R+I) component in even number columns of even number rows, a signal of (G+I) component in odd number columns of even number rows, a signal of (I) component in even number columns of odd number rows, and a signal of (B+I) component in odd number columns of odd number rows. Therefore, when the image signal which is generated by the image pickup unit 102 having the array of the pixels shown in FIG. 2 is not undergone the pixel interpolation by the synchronization unit 103, there is obtained an image signal in RAW form.

The synchronization unit 103 of FIG. 12 may be the same as one in FIG. 1. And, the color difference matrix unit 808 of FIG. 12 may be the same as one in FIG. 8.

The RAW signal output from the image pickup unit 102 is supplied to the color signal processing unit 901, undergone the signal processing described later, and supplied to the synchronization unit 902.

The synchronization unit 902 performs interpolation processing on the RAW signal (RAW4 as described below) which is output from the color signal processing unit 901, and outputs image signals R, G and B.

The brightness matrix unit 903 converts the image signal, which is output from the synchronization unit 902, into the brightness signal Y.

Figure 13:
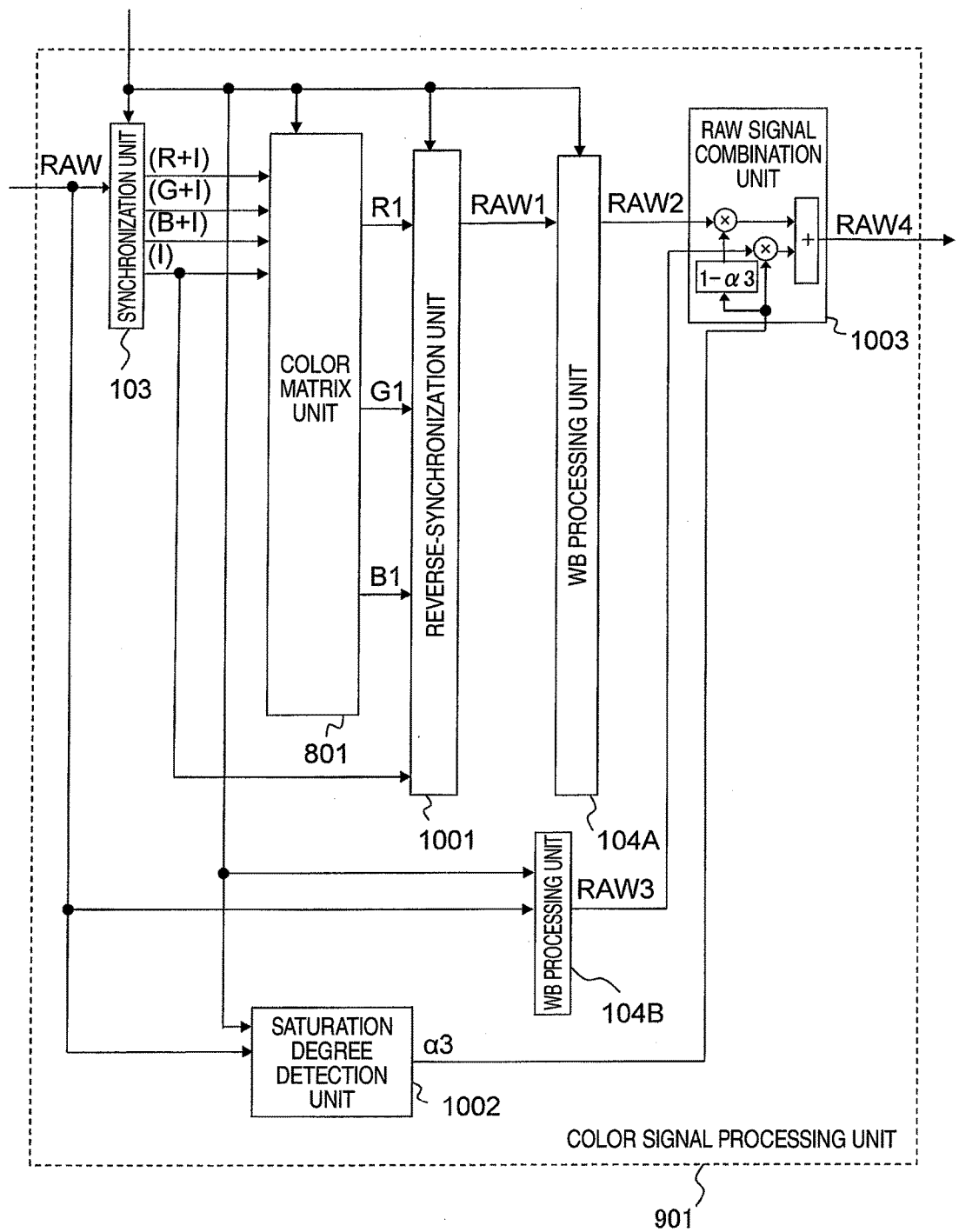
FIG. 13 is a configuration view of the color signal processing unit in Embodiment 5.

FIG. 13 is a configuration view of a color signal processing unit 901 of Embodiment 5.

The color signal processing unit 901 has a synchronization unit 103, a color matrix unit 801, a reverse-synchronization unit 1001, WB processing units 104A and 104B, a saturation degree detection unit 1002, and an RAW signal combination unit 1003.

The reverse-synchronization unit 1001 outputs as a RAW form signal (RAW1) the image signal synchronized by the synchronization unit 103 to the WB processing unit 104A.

The WB processing unit 104A performs white balance adjustment by integrating a gain corresponding to the color temperature of the light source with the RAW form image signal (RAW1), which is output from the reverse-synchronization unit 1001, and outputs the obtained RAW form image signal (RAW2) to the RAW signal combination unit 1003.

The WB processing unit 104B performs white balance adjustment by integrating a gain corresponding to the color temperature of the light source with the RAW form image signal (RAW), which is input to the color signal processing unit 902, and outputs the obtained RAW form image signal (RAW3) to the RAW signal combination unit 1003.

The saturation degree detection unit 1002 detects saturation degree α3 of the image signal which is output from the image pickup unit 102, and outputs to the RAW signal combination unit 1003.

The RAW signal combination unit 1003 combines the input image signals of two RAW forms according to the saturation degree α3, and outputs the obtained RAW form image signal (RAW4) to the synchronization unit 902 of FIG. 12.

For example, it is assumed that the synchronization unit 902, the brightness matrix unit 903, and the color difference matrix unit 808 were designed, provided that a general image pickup unit having pixels with sensitivity in the visible light region only is used. In this embodiment, the image pickup unit 102 and the color signal processing unit 901 having sensitivity in both of the visible light region and the near-infrared light region are provided in its preceding stage. Thus, there can be provided the image pickup apparatus 900 which images the subject brightly even when a scene has low light quantity.

In addition, this embodiment controls the RAW signal combination unit 1003 according to the saturation degree α3 detected by the saturation degree detection unit 1002. Thus, the image pickup apparatus 900 which also uses an infrared light region component can reduce a problem that the subject in the vicinity where a visible light signal is saturated has colors different from actual colors as described below.

Then, an operation of this embodiment is described.

In this embodiment, the image signal which is output from the color matrix unit 809 is calculated as follows in the same manner as in Embodiment 4:

$$R1 = kr3 \times (R+I) + kg3 \times (G+I) + kb3 \times (B+I) + ki3 \times (I) \quad \text{(Equation 13)},$$

$$G1 = kr4 \times (R+I) + kg4 \times (G+I) + kb4 \times (B+I) + ki4 \times (I) \quad \text{(Equation 14)},$$

and $$B1 = kr5 \times (R+I) + kg5 \times (G+I) + kb5 \times (B+I) + ki5 \times (I) \quad \text{(Equation 15)}.$$

Specifically, for example, if none of (R+I), (G+I) or (B+I) signal is saturated, the unnecessary wavelength components in the near-infrared light region can be prevented from appearing in the image signal by setting as shown below in the same manner as in Embodiment 4:

$kr3=1.00, kg3=0.00, kb3=0.00, ki3=-1.00, kr4=0.00,$
$kg4=1.00, kb4=0.00, ki4=-1.00, kr5=0.00,$
$kg5=0.00, kb5=1.00, ki5=-1.00$ (Equation 16).

The reverse-synchronization unit 1001 converts the image signals R1, G1 and B1, which are output from the color matrix unit 801e, and the signal of the (I) component, which is output from the synchronization unit 103, into the RAW form signal (RAW1), and outputs to the WB processing unit 104A.

The saturation degree detection unit 1002 determines the saturation degree α3 according to, for example, a pixel level of the RAW signal which is output from the image pickup unit 102. The saturation degree α3 is a value between 0.0 and 1.0 showing the saturation degree of the target pixel. A higher saturation degree indicates that the target pixel is close to saturation.

For example, the saturation degree can also be calculated by the same calculation equation as that of the saturation degree detection unit 111 of FIG. 1 and can also be calculated by using the same control signal as that of the saturation degree detection unit 804 of FIG. 8.

The RAW signal combination unit 1003 performs computation of Equation 20:

$RAW4=(1-\alpha 3)\times RAW2+\alpha 3\times RAW3$ (Equation 20).

Equation 19 performs computation to combine the RAW2 signal and the RAW3 signal on the basis of the saturation degree α3.

It is needless to mention that the color signal processing unit 901 shown in FIG. 13 can solely configure an apparatus as a color signal processing apparatus.

According to this embodiment, the image pickup apparatus 900 which can image the subject brightly even when a scene has low light quantity can be provided in comparison with a case using a general image pickup unit having pixels having sensitivity in a visible light region only.

In addition, according to this embodiment, this image pickup apparatus which also uses infrared light region components can reduce a problem, in which the subject in the vicinity where a visible light signal is saturated has colors different from actual colors, by controlling the RAW signal combination unit 1003 according to the saturation degree α3 detected by the saturation degree detection unit 1002.

Embodiment 6

Figure 14:
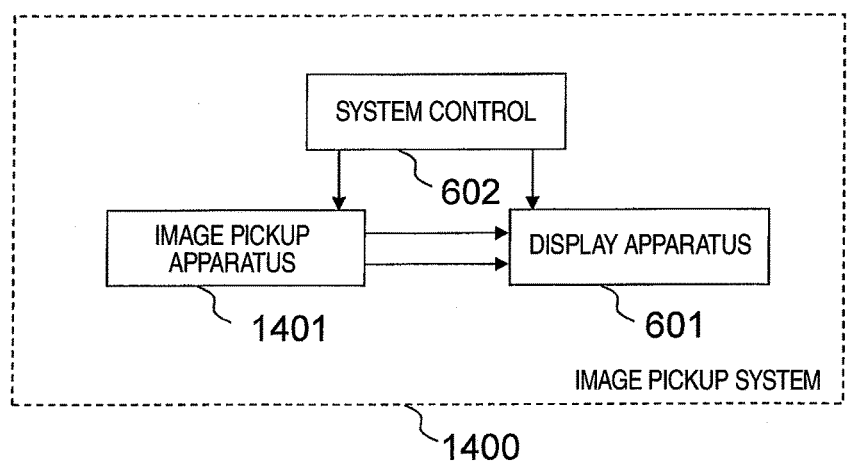
FIG. 14 is a configuration view of the image pickup system in Embodiment 6.

FIG. 14 is a configuration view of an image pickup system 1400 of Embodiment 6.

The image pickup system 1400 has an image pickup apparatus 1401, a display apparatus 601, and a system control unit 602. The image pickup apparatus 1401 may be the same as the image pickup apparatus 700 shown in Embodiment 4 or the image pickup apparatus 900 shown in Embodiment 5. The display apparatus 601 and the system control unit 602 may be the same as those shown in FIG. 6.

The system control unit 602 controls the image pickup apparatus 1401 and the display apparatus 601.

According to this embodiment, this image pickup apparatus which also uses infrared light region components for the color signal which is output from the image pickup apparatus 1401 can reduce a problem in which the subject in the vicinity where a visible light signal is saturated has colors different from actual colors, and for example, an image pickup system for vehicles requiring a high quality image for both of a bright subject and a dark subject can be provided.

Incidentally, the present invention is not limited to the above-described embodiments but includes a variety of modifications. For example, the above-described embodiments were described in detail to facilitate understandings of the present invention and are not always limited to those having all the described structures. Also, the structure of one embodiment can be partly replaced by the structure of another embodiment, and it is also possible that the structure of one embodiment is added with the structure of another embodiment. Furthermore, a part of the structure of each embodiment can be added with, deleted or replaced by another structure.

And, the above-described each structure may be partly or wholly configured of hardware or configured so as to be implemented by execution of a program by a processor. Moreover, control lines and information lines which are considered necessary for explanation are shown, and all control lines and information lines are not necessarily shown for products. Actually, it may be construed that almost all the structures are connected mutually.

REFERENCE SIGNS LIST

100 image pickup apparatus
101 lenses
102 image pickup unit
103 synchronization unit
104 WB processing unit
105 first brightness coefficient output unit
106 second brightness coefficient output unit
107 first brightness signal generation unit
108 second brightness signal generation unit
109 brightness signal combination unit
110 brightness gamma unit
111 saturation degree detection unit
112 color difference signal generation unit
113 color difference gamma unit
114 control unit
115 brightness signal processing unit
200 image pickup apparatus
201 brightness signal combination unit
202 brightness signal processing unit
401 (R+I) pixel
402 (G+I) pixel
403 (I) pixel
404 (B+I) pixel
600 image pickup system
601 display apparatus
602 system control unit
700 image pickup apparatus
701 brightness signal processing unit
702 color signal processing unit
801 color matrix unit
802 I coefficient output unit
803 I signal adding unit
804 saturation degree detection unit
805 R signal combination unit
806 G signal combination unit
807 B signal combination unit
808 color difference matrix unit
900 image pickup apparatus
901 color signal processing unit
902 synchronization unit 903 brightness matrix unit
1001 reverse-synchronization unit
1002 saturation degree detection unit
1003 RAW signal combination unit
1400 image pickup system

The invention claimed is:

1. An image pickup apparatus for imaging a subject, comprising:
an image pickup element including a visible light region pixel sensitive to light in a visible light region and a near-infrared light region, and a near-infrared region pixel sensitive to light in a near-infrared light region;
saturation detection circuitry configured to detect a saturation degree of an image signal based on a first image signal that corresponds to light in a visible light region and a near-infrared light region sensed by the visible light region pixel, and a second image signal that corresponds to light in a near-infrared light region sensed by the near-infrared region pixel; and
color signal processing circuitry including a first processing circuitry for generating a first color signal by removing a signal corresponding to light in the near-infrared light region from the first image signal and,
a second processing circuitry for generating a second color signal from the first image signal,
wherein the color signal processing circuitry is configured to combine the first color signal output from the first processing circuitry and the second color signal output from the second processing circuitry with a ratio set based on the detected saturation degree, the ratio being a ratio of the second color signal to the first color signal and the ratio increases as the detected saturation degree increases.

2. The image pickup apparatus according to claim 1, wherein the color signal processing circuitry further comprises:
first white balance processing circuitry which adjusts a white balance of the first color signal; and
second white balance processing circuitry which adjusts a white balance of the second color signal.

3. The image pickup apparatus according to claim 1, wherein the color signal processing circuitry is further configured to, when a value of the first color signal generated by the first processing circuitry is zero or a negative value, add a signal corresponding to light in the near-infrared light region to the first color signal.

4. The image pickup apparatus according to claim 1, wherein the first color signal and the second color signal are three primary color signals.

5. The image pickup apparatus according to claim 1, wherein the first color signal and the second color signal are color signals in a RAW form without undergoing pixel interpolation processing of pixels of the image pickup element.

6. The image pickup apparatus according to claim 1, wherein:
the color signal processing circuitry further comprises a color difference matrix circuitry which converts the combination of the first color signal and the second color signal into a color difference signal and outputs the color difference signal, and
wherein the image pickup apparatus further comprises a color difference gamma unit which performs gamma correction to correct characteristics of a device displaying the imaged subject based on the color difference signal output from the color difference matrix circuitry.

7. An image pickup apparatus for imaging a subject, comprising:
a visible light region pixel sensitive to light in a visible light region and a near-infrared light region, and a near-infrared region pixel sensitive to light in the near-infrared light region;
a controller, connected to the visible light region pixel and the near-infrared region pixel, programmed to:
detect a saturation degree of an image signal based on a first image signal that corresponds to light in a visible light region and a near-infrared light region sensed by the visible light region pixel, and a second image signal that corresponds to light in a near-infrared light region sensed by the near-infrared region pixel,
generate a first color signal by removing a signal corresponding to light in the near-infrared light region from the first image signal,
generate a second color signal from the first image signal,
combine the first color signal and the second color signal with a ratio set based on the detected saturation degree, the ratio being a ratio of the second color signal to the first color signal and the ratio increases as the saturation degree increases.

8. A method of processing an image in image pickup apparatus for imaging a subject, the method comprising:
sensing light in a visible light region and a near-infrared light region, by a visible light region pixel, and sensing light in the near-infrared light region, by a near-infrared region pixel;
detecting a saturation degree of an image signal based on a first image signal that corresponds to light in a visible light region and a near-infrared light region sensed by the visible light region pixel, and a second image signal that corresponds to light in a near-infrared light region sensed by the near-infrared region pixel;
generating a first color signal by removing a signal corresponding to light in the near-infrared light region from the first image signal;
generating a second color signal from the first image signal; and
combining the first color signal and the second color signal with a ratio set based on the detected saturation degree, the ratio being a ratio of the second color signal to the first color signal and the ratio increases as the saturation degree increases.

* * * * *